(12) United States Patent
Kitagawa et al.

(10) Patent No.: US 7,529,593 B2
(45) Date of Patent: May 5, 2009

(54) HOT WATER SUPPLY SYSTEM

(75) Inventors: Hideki Kitagawa, Nagoya (JP);
Kumiko Yasutani, Nagoya (JP); Ikuro Adachi, Nagoya (JP)

(73) Assignee: Rinnai Corporation, Nagoya-shi (JP)

( * ) Notice: Subject to any disclaimer, the term of this patent is extended or adjusted under 35 U.S.C. 154(b) by 308 days.

(21) Appl. No.: 11/531,514

(22) Filed: Sep. 13, 2006

(65) Prior Publication Data

US 2007/0067047 A1    Mar. 22, 2007

(30) Foreign Application Priority Data

Sep. 16, 2005    (JP)    ............... 2005-270788

(51) Int. Cl.
*G06F 19/00*    (2006.01)
(52) U.S. Cl. ........................... 700/3; 340/870
(58) Field of Classification Search .............. 700/3, 700/19, 20, 275, 300; 237/8 R, 19, 59, 7; 261/130; 340/870
See application file for complete search history.

(56) References Cited

U.S. PATENT DOCUMENTS 5,125,572 A * 6/1992 Piegari ................... 237/8 R
5,183,029 A * 2/1993 Ranger ................... 122/13.3
5,294,051 A * 3/1994 Piegari ................... 237/8 R
6,220,620 B1 * 4/2001 Harroun ................. 280/650
7,234,646 B2 * 6/2007 Saitoh et al. .............. 237/2 B
2003/0200011 A1 * 10/2003 Grauer ................... 700/300

FOREIGN PATENT DOCUMENTS

JP    2002-357361    12/2002
JP    2003-222399    8/2003

* cited by examiner

*Primary Examiner*—Kidest Bahta
(74) *Attorney, Agent, or Firm*—Rankin, Hill & Clark LLP

(57) ABSTRACT

A hot water supply system which allows two hot water supply apparatuses to operate cooperatively and which can avoid degrading a hot water supply capability when one of the two hot water supply apparatuses cannot perform as a master or slave. The two hot water supply apparatuses each have a connection communication terminal, a master controller, an external communication terminal, and a slave controller. The hot water supply system includes a communication cable via which the connection communication terminal of one of the two hot water supply apparatuses is connected to the external communication terminal of the other hot water supply apparatus, and a failure reporting device for reporting a failure in the master controller provided in the hot water supply apparatus operating as the master and a failure in the slave controller provided in the hot water supply apparatus operating as the slave.

8 Claims, 3 Drawing Sheets

HOT WATER SUPPLY SYSTEM

BACKGROUND OF THE INVENTION

1. Field of the Invention

The present invention relates to a hot water supply system in which two hot water supply apparatuses are communicatively connected together to cooperatively perform a hot water supply operation.

2. Description of the Related Art

Hot water supply systems have been known which provide improved hot water supply capabilities by communicatively connecting a plurality of hot water supply apparatuses to a connection unit that allows the plurality of hot water supply apparatuses to cooperatively supply hot water; a water supply pipe and a hot water supply pipe are connected in parallel to each of the plurality of hot water supply apparatuses (see, for example, Japanese Patent Laid-Open No. 2002-357361).

In a known hot water supply system in which two hot water supply apparatuses cooperatively supply hot water, a controller in each of the hot water supply apparatuses provides a function for controlling a cooperative operation. The two hot water supply systems are directly connected together via a communication cable so that one of the hot water supply apparatuses operates as a master, while the other operates as a slave (see, for example, Japanese Patent Laid-Open No. 2003-222399). This hot water supply system eliminates the need for a connection unit, thus enabling a reduction in the cost of and the installation space for the connection unit.

In the above system, the controller in each of the hot water supply apparatuses provides a function for controlling a cooperative operation to allow the two hot water supply apparatuses to perform the cooperative operation. Then, when the controller provided in one of the hot water supply apparatuses fails and can no longer control the cooperative operation, the failing controller needs to be replaced with a new one. Before a new controller for replacement is available, the normal hot water supply apparatus can independently perform a hot water supply operation. Thus, disadvantageously, the level of the hot water supply capability of the hot water supply system decreases to half.

An object of the present invention is to eliminate this disadvantage to provide a hot water supply system which allows two hot water supply apparatuses to operate cooperatively to supply hot water and which can avoid degrading a hot water supply capability when one of the two hot water supply apparatuses cannot perform as a master or slave.

SUMMARY OF THE INVENTION

The present invention is made to accomplish the above object and relates to a hot water supply system that performs a cooperative hot water supply operation using two hot water supply apparatuses communicatively connected together, one of the two hot water supply apparatuses serving as a master that transmits a control signal to the other hot water supply apparatus serving as a slave which operates upon receiving the control signal, to cooperatively supply hot water.

The hot water supply system is characterized in that each of the hot water supply apparatuses has a first connection terminal, master control means for transmitting a control signal for slave operation to the slave hot water supply apparatus via the first connection terminal in operating as the master, a second connection terminal, slave control means for performing a hot water supply operation in accordance with the control signal for slave operation received via the second connection terminal in operating as the slave, and operation selecting means for selecting whether to operate as the master or slave, and in that the system comprises a communication cable via which the first connection terminal of one of the two hot water supply apparatuses is connected to the second connection terminal of the other hot water supply apparatus, and failure reporting means for at least either making a first report indicating a failure occurring in the master control means provided in one of the two hot water supply apparatuses which is operating as the master, or making a second report indicating a failure occurring in the slave control means provided in one of the two hot water supply apparatuses which is operating as the slave.

According to the present invention, each of the two hot water supply apparatuses comprises the first connection terminal, the master control means, the second connection terminal, and the slave control means. The first connection terminal provided in one of the two hot water supply apparatuses is connected via the communication cable to the second connection terminal provided in the other hot water supply apparatus. With the hot water supply apparatuses thus connected together, the operation selecting means selects the master and slave hot water supply apparatuses. A cooperative hot water supply operation can then be performed by allowing the hot water supply apparatus with the communication cable connected to the first connection terminal to operate as a master, while allowing the hot water supply apparatus with the communication cable connected to the second connection terminal to operate as a slave.

When the master control means provided in the hot water supply apparatus operating as the master fails, the failure reporting means makes the first report. Then, the user removes the communication cable. The user then connects the second connection terminal of the hot water supply apparatus previously operating as the master to the first connection terminal of the hot water supply apparatus previously operating as the slave via the communication cable. The operation selecting means reselects the master and slave hot water supply apparatuses. The failure can thus be coped with. This operation enables the hot water supply apparatus previously operating as the master to operate as the slave, while enabling the hot water supply apparatus previously operating as the slave to operate as the master. The two hot water supply apparatuses can thus continue the cooperative hot water supply operation to avoid degrading the hot water supply capability.

Similarly, when the slave control means provided in the hot water supply apparatus operating as the slave fails, the failure reporting means makes the second report. Then, the user removes the communication cable. The user then connects the first connection terminal of the hot water supply apparatus previously operating as the slave to the second connection terminal of the hot water supply apparatus previously operating as the master via the communication cable. The operation selecting means reselects the master and slave hot water supply apparatuses. The failure can thus be coped with. This operation enables the hot water supply apparatus previously operating as the slave to operate as the master, while enabling the hot water supply apparatus previously operating as the master to operate as the slave. The two hot water supply apparatuses can thus continue the cooperative hot water supply operation to avoid degrading the hot water supply capability.

The hot water supply system is also characterized in that each of the two hot water supply apparatuses comprises independent operation control means for allowing the hot water supply apparatus to independently perform a hot water supply operation when the communication cable is not connected to the first connection terminal or second terminal of the hot water supply apparatus.

This aspect of the present invention eliminates the need to provide a specification for a hot water supply apparatus for performing a cooperative hot water supply operation and a separate specification for a hot water supply apparatus for independently performing a hot water supply operation. This enables parts to be shared and facilitates management of parts, thus reducing costs.

The hot water supply system is further characterized in that each of the two hot water supply apparatuses has a third connection terminal to which a remote controller is connected, and the master control means provided in one of the hot water supply apparatuses which is operating as the master performs the cooperative hot water supply operation in accordance with a control signal transmitted by the remote controller when the remote controller is connected to the third connection terminal of the hot water supply apparatuses operating as the master, and performs the cooperative hot water supply operation in accordance with a control signal transmitted by the remote controller when the remote controller is not connected to the third connection terminal of the hot water supply apparatuses operating as the master but is connected to the third connection terminal of the hot water supply apparatuses operating as the slave.

With this aspect of the present invention, the following operation is possible by connecting the remote controller to the third connection terminal of one of the two hot water supply apparatuses. When the communication cable is reconnected to allow the master hot water supply apparatus to operate as the slave, while allowing the slave hot water supply apparatus to operate as the master, the user can use the remote controller to instruct the cooperative hot water supply operation to be performed without the need to change the apparatus to which the remote controller is connected.

The hot water supply system is further characterized in that each of the two hot water supply apparatuses has a first circuit board on which a first microcomputer is mounted and a second circuit board on which a second microcomputer is mounted, and the master control means is provided in the first microcomputer, and the slave control means is provided in the second microcomputer.

In this aspect of the present invention, the master and slave control means are provided in the first and second microcomputers, respectively, mounted on the different boards. This reduces the possibility that both the master and slave control means fail in the first or second hot water supply apparatus, thus disabling the cooperative hot water supply operation.

DETAILED DESCRIPTION OF THE PREFERRED EMBODIMENTS

Figure 1:
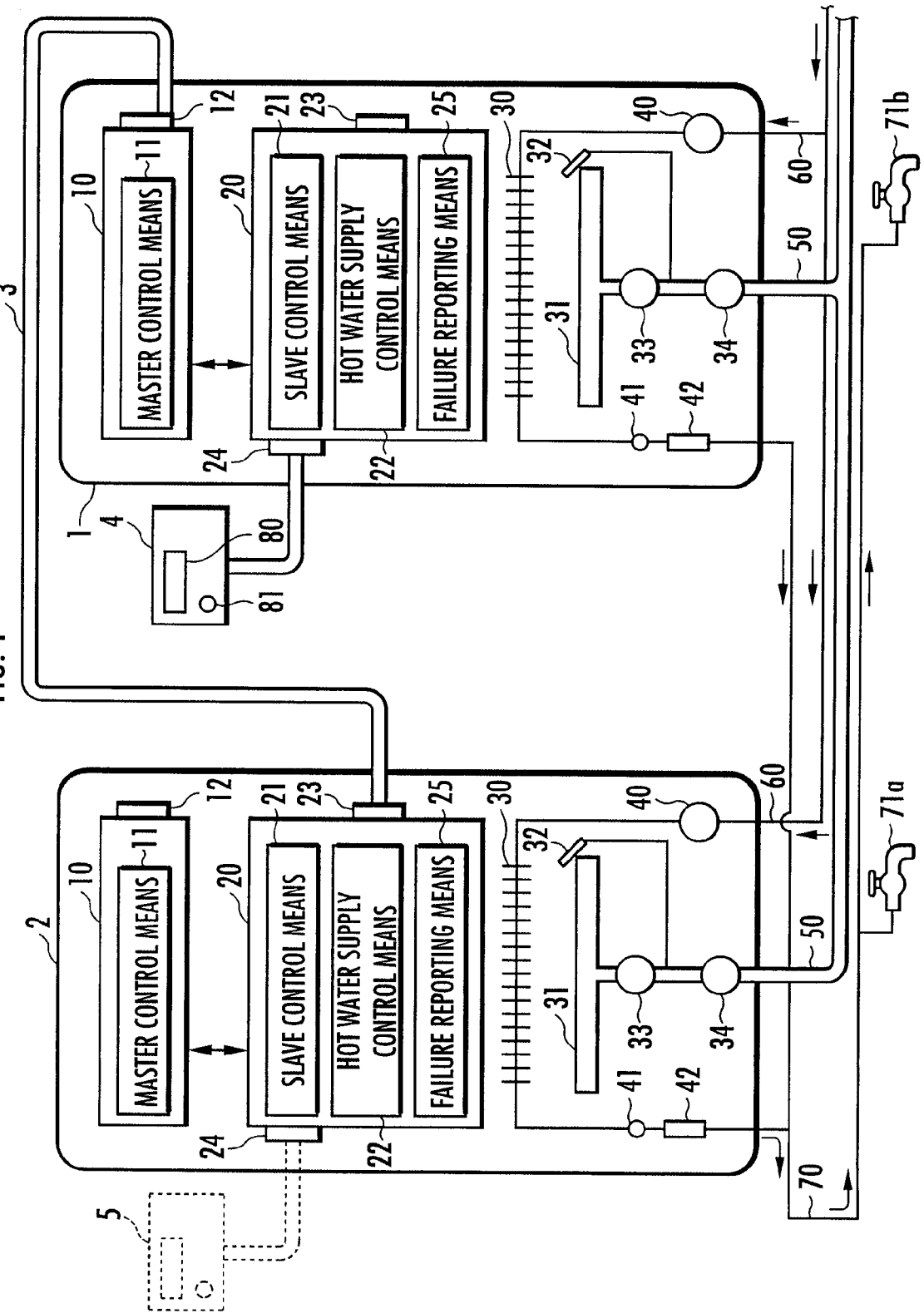
FIG. 1 is a diagram showing the configuration of an entire hot water supply system of the present invention.
Figure 2:
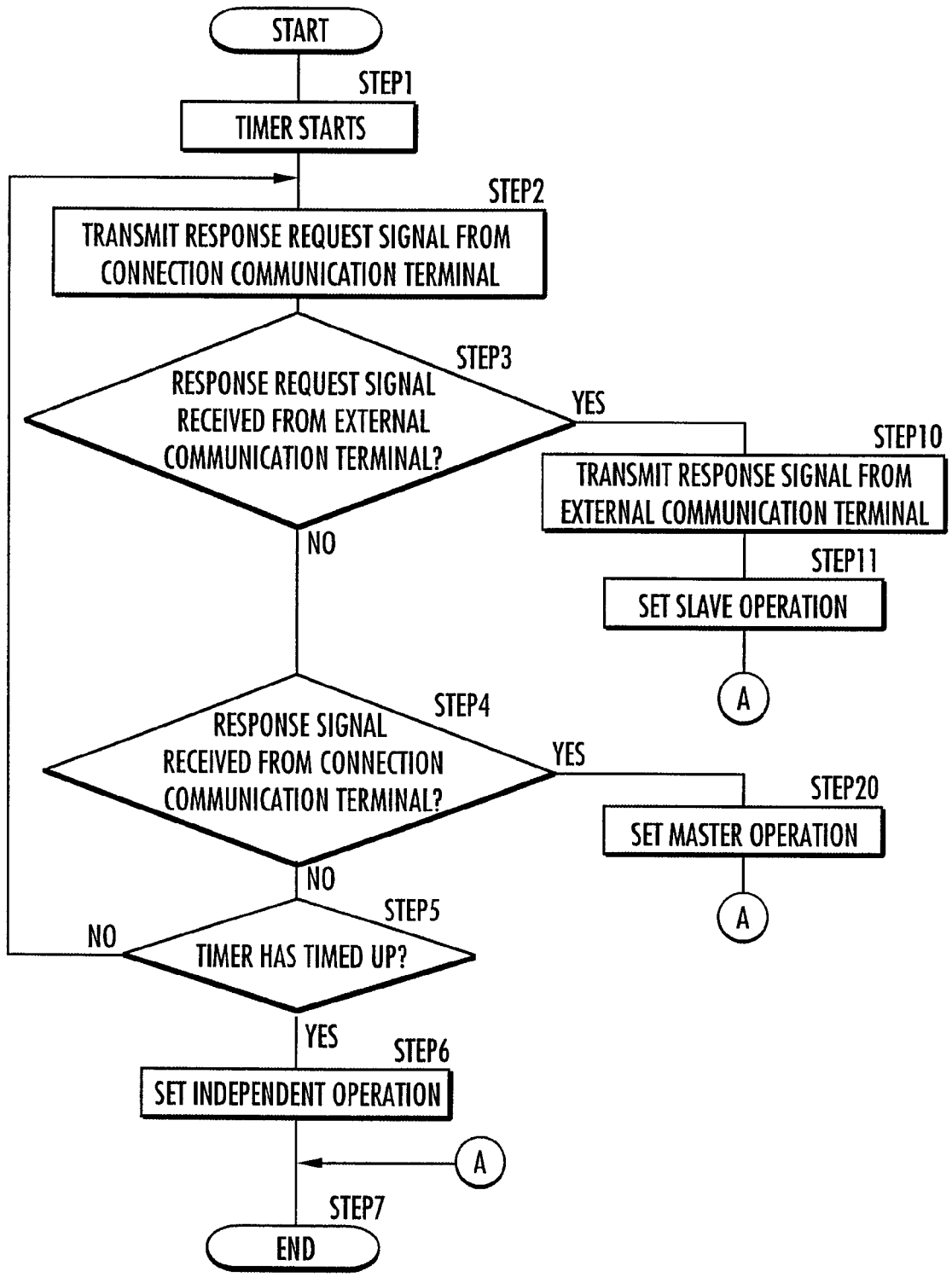
FIG. 2 is a flowchart showing a process of selecting a hot water supply apparatus operating as a master and a hot water supply apparatus operating as a slave.
Figure 3:
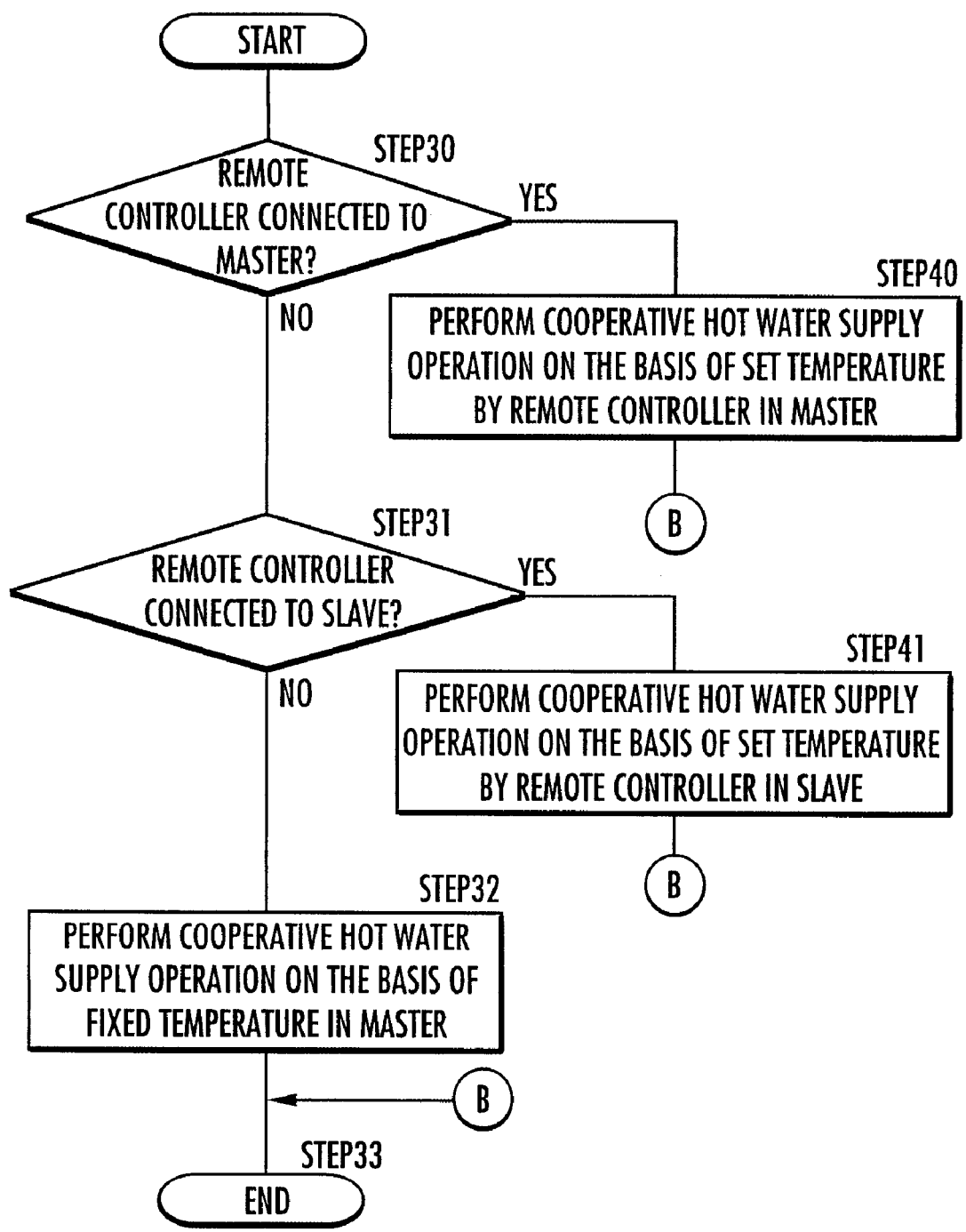
FIG. 3 is a flowchart showing a process of selecting a target hot water supply temperature for a cooperative hot water supply operation.

With reference to FIGS. 1 to 3, description will be given of the best mode for carrying out the present invention. FIG. 1 is a diagram showing the configuration of an entire hot water supply system of the present invention. FIG. 2 is a flowchart showing a process of selecting a hot water supply apparatus operating as a master and a hot water supply apparatus operating as a slave. FIG. 3 is a flowchart showing a process of selecting a target hot water supply temperature for a cooperative hot water supply operation.

With reference to FIG. 1, hot water supply apparatuses 1 and 2 are connected together via a communication cable 3 so as to perform a cooperative hot water supply operation where the hot water supply apparatuses 1 and 2 cooperate to provide hot water; the hot water supply apparatus 1 serves as a master that transmits a control signal instructing the hot water supply apparatus 2 to perform a hot water supply operation, and the hot water supply apparatus 2 serves as a slave that performs a hot water supply operation upon receiving the control signal by the hot water supply apparatus 1. A remote controller 4 is connected to the hot water supply apparatus 1; the remote controller 4 comprises a switch that instructs the hot water supply apparatus 1 to, for example, set a target hot water supply temperature or to switch between an operation state and a standby state.

Each of the hot water supply apparatuses 1 and 2 comprises a heat exchanger 30 which heats water supplied through a water supply pipe 60 and which delivers hot water to a hot water supply pipe 70, a water supply on-off valve 40 that opens and closes the water supply pipe 60, a hot water supply temperature sensor 41 that detects the temperature of hot water delivered to the hot water supply pipe 70 by the heat exchanger 30, a flow rate sensor 42 that detects the flow of hot water delivered to the hot water supply pipe 70 by the heat exchanger 30, a main burner 31 that heats the heat exchanger 30, a pilot burner 32 that ignites the main burner 31, a gas source valve 34 that opens and closes a gas supply pipe 50 that is in communication with the main burner 31 and pilot burner 32, and a heating power regulating valve 33 that varies the opening of the gas supply pipe 50 to regulate the flow of a fuel gas supplied to the main burner 31.

Each of the first and second hot water supply apparatuses 1 and 2 further comprises a first circuit board 10 and a second circuit board 20. A microcomputer (not shown; corresponding to a first microcomputer of the present invention) mounted on the first circuit board 10 comprises master control means 11 for controlling the operation of the hot water supply apparatus 1 or 2 operating as a master.

A microcomputer (not shown; corresponding to a second microcomputer of the present invention) mounted on the second circuit board 20 comprises slave control means 21 for controlling the operation of the hot water supply apparatus 1 or 2 operating as a slave, hot water supply control means 22 that regulates the opening of the heating power regulating valve 33 to control the quantity of heat generated by the main burner 31 so as to allow the heat exchanger 30 to deliver hot water at the target hot water supply temperature, and failure reporting means 25 for reporting a failure upon detecting a failure in the master control means 11 or the slave control means 21.

A report made upon detecting a failure in the master control means 11 corresponds to a first report of the present invention. A report made upon detecting a failure in the slave control means 21 corresponds to a second report of the present invention. The failure reporting means 25 reports a failure by displaying a failing component (master control means 11 or slave control means 21) on a display section 80 of the remote controller 4, and activating a buzzer 81 in the remote controller 4.

The second circuit board 20 comprises a remote control communication terminal 24 (corresponding to a third connection terminal of the present invention) to which the remote controller 4 is connected, and an external communication terminal 23 (corresponding to a second connection terminal of the present invention) to which the communication cable 3 is connected when the hot water supply apparatus operates as the slave.

External equipment can be connected to the external communication terminal 23 so that the hot water supply apparatus can communicate with the external equipment. For example, when the hot water supply apparatus 1 or 2 is shipped from the factory or installed at a site, an inspection device can be connected to the external communication terminal 23 to inspect the hot water supply apparatus 1 or 2 for defects.

The first circuit board 10 also comprises a connection communication terminal 12 to which the communication cable 3 is connected when the hot water supply apparatus operates as a master. Then, one (in FIG. 1, the hot water supply apparatus 1) of the two hot water supply apparatuses 1 and 2 which has the communication cable 3 connected to the connection communication terminal 12 can operate as the master. One (in FIG. 1, the hot water supply apparatus 2) of the two hot water supply apparatuses 1 and 2 which has the communication cable 3 connected to the external communication terminal 23 can operate as the slave.

When the communication cable 3 is not connected to the connection communication terminal 12 or external communication terminal 23, the hot water supply apparatus 1 or 2 independently performs a hot water supply operation. In this case, the hot water supply control means 22 controls the combustion quantity of the main burner 31 so that the heat exchanger 30 delivers hot water at the target hot water supply temperature set by the remote controller 4. Independent operation control means of the present invention corresponds to the arrangement in which the hot water supply control means 22 allows the hot water supply apparatus 1 or 2 to independently perform a hot water supply operation.

Now, with reference to FIG. 1 and in accordance with the flowchart shown in FIG. 2, description will be given of a process of selecting one of the hot water supply apparatuses 1 and 2 to operate as the master while selecting the other to operate as the slave, taking the case of the connection form shown in FIG. 1 as an example.

The hot water supply apparatuses 1 and 2 are connected together via the communication cable 3 and then powered on. The hot water supply apparatuses 1 and 2 then start executing the flowchart shown in FIG. 2. First, in STEP1 in FIG. 2, a timer is started for which clocking time is set taking communication time into account. In STEP2, the master control means 11 transmits a "response request signal" from the connection communication terminal 12. This allows the hot water supply apparatus 1 having the communication cable 3 connected to the connection communication terminal 12 to transmit the "response request signal" via the communication cable 3 to the hot water supply apparatus 2 having the communication cable 3 connected to the external communication terminal 23. On the other hand, the hot water supply apparatus 2 not having the communication cable 3 connected to the connection communication terminal 12 does not transmit the "response request signal" to the hot water supply apparatus 1.

In STEP3, in the hot water supply apparatus 2, the slave control means 21 receives the "response request signal" transmitted via the communication cable 3 from the connection communication terminal 12 of the hot water supply apparatus 1. Thus, the process branches to STEP10. The slave control means 21 then transmits a "response signal" from the external communication terminal 23. This allows the "response signal" to be transmitted from the external communication terminal 23 of the hot water supply apparatus 2 to the connection communication terminal 12 of the hot water supply apparatus 1 via the communication cable 3. The process proceeds to STEP11. A "slave operation" is then set for the hot water supply apparatus 2 by the slave control means 21; in the slave operation, the hot water supply apparatus 2 operates as the slave. This selects the hot water supply apparatus 2 as the slave.

On the other hand, in the hot water supply apparatus 1, the "response request signal" is not transmitted to the external communication terminal 23. Accordingly, in STEP3, the slave control means 21 does not receive the "response request signal" from the external communication terminal 23. Thus, the process proceeds from STEP3 to STEP4. In STEP4, the master control means 11 then executes the above processing in STEP10 to receive, through the connection communication terminal 12, the "response signal" transmitted from the external communication terminal 23 of the hot water supply apparatus 2 via the communication cable 3. The process thus branches from STEP4 to STEP20. In the hot water supply apparatus 1, the master control means 11 sets a "master operation" in which the hot water supply apparatus 1 operates as the master. This selects the hot water supply apparatus 1 as the master.

If the "response request signal" is not received from the external communication terminal 23 in STEP3, the "response signal" is not received from the connection communication terminal 12 in STEP4, and a timer times up in STEP5, then the system can determine that the communication cable 3 is not connected to the external communication terminal 23 or connection communication terminal 12. Thus, in this case, the process proceeds from STEP5 to STEP6. Hot water supply control means 22*a* then sets an "independent operation" in which an independent hot water supply operation is performed.

Operation selecting means of the present invention corresponds to the arrangement in which, when the hot water supply apparatuses 1 and 2 are powered on, the master control means 11 and slave control means 21 determine whether each of the hot water supply apparatuses 1 and 2 operates as the master or slave.

In a connection form different from that shown in FIG. 1, the connection communication terminal 12 of the hot water supply apparatus 2 is connected to the external communication terminal 23 of the hot water supply apparatus 1 via the connection communication cable 3. Then, executing the processing shown in the flowchart in FIG. 2 selects the hot water supply apparatus 2 as the master and the hot water supply apparatus 1 as the slave.

While the hot water supply apparatuses 1 and 2 are performing a cooperative hot water supply operation in the connection form shown in FIG. 1, the failure reporting means 25 of the hot water supply apparatus 1 may report a failure in the master control means 11 of the hot water supply apparatus 1. Then, the user removes the communication cable 3 from the hot water supply apparatuses 1 and 2. The user then connects the connection communication terminal 12 of the hot water supply apparatus 2 to the external communication terminal 23 of the hot water supply apparatus 1 via the communication cable 3. The user then powers on the hot water supply apparatuses 1 and 2 again. This makes it possible to select the hot water supply apparatus 2 as the master and the hot water supply apparatus 1 as the slave.

This allows the hot water supply apparatus 1 operating as the master to operate as the slave, while allowing the hot water supply apparatus 2 operating as the slave to operate as the master, to continue a cooperative hot water supply operation.

Thus, before a new first circuit board 10 for replacement is available, a cooperative hot water supply operation can be continued. This makes it possible to avoid degrading the hot water supply capability in spite of the failure in the master control means 11.

While the hot water supply apparatuses 1 and 2 are performing a cooperative hot water supply operation in the connection form shown in FIG. 1, the failure reporting means 25 of the hot water supply apparatus 2 may report a failure in the slave control means 21 of the hot water supply apparatus 2. Then, the user removes the communication cable 3 from the hot water supply apparatuses 1 and 2. The user then connects the connection communication terminal 12 of the hot water supply apparatus 2 to the external communication terminal 23 of the hot water supply apparatus 1 via the communication cable 3. The user then powers on the hot water supply apparatuses 1 and 2 again. This makes it possible to select the hot water supply apparatus 2 as the master and the hot water supply apparatus 1 as the slave.

This allows the hot water supply apparatus 1 operating as the master to operate as the slave, while allowing the hot water supply apparatus 2 operating as the slave to operate as the master, to continue a cooperative hot water supply operation. Thus, before a new second circuit board 20 for replacement is available, a cooperative hot water supply operation can be continued. This makes it possible to avoid degrading the hot water supply capability in spite of the failure in the slave control means 21.

Now, in accordance with the flowchart shown in FIG. 3, description will be given of a process of selecting a target hot water supply temperature for a cooperative hot water supply operation. The master control means 11 provided in one (in FIG. 1, the hot water supply apparatus 1) of the hot water supply apparatuses 1 and 2 which operates as the master determines in STEP30 whether or not the remote controller 4 is connected to the remote control communication terminal 24 of the hot water supply apparatus.

When the remote controller 4 is connected to the remote control communication terminal 24, the process branches to STEP40. A cooperative hot water supply operation is then performed using, as the target hot water supply temperature, the temperature set by the remote controller 4 connected to the master hot water supply apparatus. In STEP30, when the remote controller 4 is not connected to the remote control communication terminal 24 of the hot water supply apparatus operating as the master, the process proceeds to STEP31. The master control means 11 determines whether or not a remote controller 5 is connected to the remote control communication terminal 24 of the hot water supply apparatus 2 operating as the slave.

When the remote controller 5 is connected to the remote control communication terminal 24 of the hot water supply apparatus 2, the process branches to STEP41. A cooperative hot water supply operation is then performed using, as the target hot water supply temperature, the temperature set by the remote controller 5 connected to the slave hot water supply apparatus. In STEP31, when the remote controller 5 is not connected to the remote control communication terminal 24 of the hot water supply apparatus operating as the slave, the process proceeds to STEP32. The master control means 11 performs a cooperative hot water supply operation using a preset fixed temperature as the target hot water supply temperature.

Thus, when the remote controller is connected to the master hot water supply apparatus, the master control means 11 performs a cooperative hot water supply operation using the temperature set in this remote controller as the target hot water supply temperature. When the remote controller is not connected to the master hot water supply apparatus, the master control means 11 performs a cooperative hot water supply operation using the temperature set in the remote controller connected to the slave hot water supply apparatus as the target hot water supply temperature.

Thus, even if the master control means 11 or slave control means 21 fails and the communication cable 3 is reconnected to reselect the master and slave hot water supply apparatuses, the remote controller 4 need not be reconnected.

Now, description will be given of a procedure in which the hot water supply apparatuses 1 and 2 perform a cooperative hot water supply operation. The user operates an operation switch (not shown) provided on the remote controller 4. The master control means 11 of the hot water supply apparatus 1 transmits a control signal instructing the hot water supply control means 22 of each of the hot water supply apparatuses 1 and 2 to ignite the pilot burner 32. Upon receiving the control signal, the hot water supply control means 22 of each of the hot water supply apparatuses 1 and 2 opens the gas source valve 34 to ignite the pilot burner 32.

The water supply on-off valve 40 of each of the hot water supply apparatuses 1 and 2 is opened by operating the operation switch. When the user opens a faucet 71i a or 71b, the flow rate detected by the flow rate sensor 42 of each of the hot water supply apparatuses 1 and 2 is transmitted to the master control means 11 of the master hot water supply apparatus 1.

When the flow rate detected by the flow rate sensor 42 of each of the hot water supply apparatuses 1 and 2 is equal to or larger than a preset minimum value, the master control means 11 of the hot water supply apparatus 1 transmits a control signal instructing the hot water supply control means 22 of each of the hot water supply apparatuses 1 and 2 to ignite the main burner 31. Upon receiving the control signal, the hot water supply control means 22 of each of the hot water supply apparatuses 1 and 2 opens the heating power regulating valve 33 to ignite the main burner 30.

The flow rate detected by the flow rate sensor 42 of each of the hot water supply apparatuses 1 and 2 is classified into three levels, "low", "medium", and "high". When the flow rate detected by the flow rate sensor 42 of each of the hot water supply apparatuses 1 and 2 is within the "middle" range, the master control means 11 of the hot water supply apparatus 1 actuates both the supply apparatuses 1 and 2 to perform a cooperative hot water supply operation.

Subsequently, the quantity of hot water supplied through the faucet 71a or 71b decreases, so that the flow rate detected by the flow rate sensor 42 in one of the hot water supply apparatuses 1 and 2 falls within the "low" range, then the master control means 11 of the hot water supply apparatus 1 stops the hot water supply operation of one of the hot water supply apparatuses 1 and 2 to allow only the other hot water supply apparatus to perform a cooperative hot water supply operation.

In contrast, while only one of the hot water supply apparatuses 1 and 2 is performing a hot water supply operation, the flow rate detected by the flow rate sensor 42 of the hot water supply apparatus performing the hot water supply operation may increase to fall within the "high" range. The master control means 11 of the hot water supply apparatus 1 actuates the hot water supply apparatus that has stopped the hot water supply operation.

The hot water supply operation of the hot water supply apparatus 1 or 2 is performed or stopped by opening or closing the water supply on-off valve 40. Specifically, opening the water supply on-off valve 40 enables the hot water supply apparatus 1 or 2 to perform a hot water supply operation.

Closing the water supply on-off valve 40 enables the hot water supply apparatus 1 or 2 to stop the hot water supply operation.

As described above, in the cooperative hot water supply operation performed by the hot water supply apparatuses 1 and 2, the number of hot water supply apparatuses involved in the hot water supply operation varies. Thus, to prevent one of the hot water supply apparatuses from being degraded more severely than the other owing to the much longer time for which the former hot water supply apparatus has performed a hot water supply operation, the master control means 11 of the hot water supply apparatus 1 accumulates the hot water supply operation time for each of the hot water supply apparatuses 1 and 2. The master control means 11 of the hot water supply apparatus 1 selects the hot water supply apparatus independently performing a hot water supply operation so that the accumulated hot water supply operation time of the hot water supply apparatus 1 is almost the same as that of the hot water supply apparatus 2.

In the present embodiment, when the communication cable 3 is not connected to the hot water supply apparatus 1 or 2, the hot water supply control means 22 independently performs a hot water supply operation. However, the effects of the present invention can be exerted without this arrangement.

In the present embodiment, the need to reconnect the remote controller is eliminated by the processing shown in the flowchart in FIG. 3. However, the effects of the present invention can be exerted without this processing.

In the present embodiment, as shown in FIG. 1, the master control means 11 and slave control means 21 are provided in the microcomputers mounted on the circuit boards 10 and 20, respectively. This reduces the possibility that a failure occurs simultaneously in the master control means 11 and slave control means 21. However, the effects of the present invention can be exerted without this arrangement.

In the present embodiment, as shown in FIG. 2, the operation selecting means of the present invention selects the hot water supply apparatus operating as the master and the hot water supply apparatus operating as the slave, on the basis of the communication process executed between the hot water supply apparatuses 1 and 2 when the apparatuses are powered on. However, for example, the operation selecting means of the present invention may be configured differently. For example, a selection switch is provided in each of the hot water supply apparatuses 1 and 2 to switch between the master and slave.

What is claimed is:

1. A hot water supply system which performs a cooperative hot water supply operation using two hot water supply apparatuses communicatively connected together, one of the two hot water supply apparatuses serving as a master which transmits a control signal to the other hot water supply apparatus serving as a slave which operates upon receiving the control signal, to cooperatively supply hot water, wherein each of the hot water supply apparatuses has a first connection terminal, master control means for, when the hot water supply apparatus operates as the master, transmitting a control signal for slave operation to the slave hot water supply apparatus via the first connection terminal, a second connection terminal, slave control means for, when the hot water supply apparatus operates as a slave, performing a hot water supply operation in accordance with the control signal for slave operation received via the second connection terminal, and operation selecting means for selecting whether to operate as the master or slave; and the system comprises a communication cable via which the first connection terminal of one of the two hot water supply apparatuses is connected to the second connection terminal of the other hot water supply apparatus, and failure reporting means for at least either making a first report indicating a failure occurring in the master control means provided in one of the two hot water supply apparatuses which is operating as the master, or making a second report indicating a failure occurring in the slave control means provided in one of the two hot water supply apparatuses which is operating as the slave.

2. The hot water supply system according to claim 1, wherein each of the two hot water supply apparatuses comprises independent operation control means for allowing the hot water supply apparatus to independently perform the hot water supply operation when the communication cable is not connected to the first connection terminal or second connection terminal of the hot water supply apparatus.

3. The hot water supply system according to claim 1, wherein each of the two hot water supply apparatuses has a third connection terminal to which a remote controller may be connected, and the master control means provided in one of the hot water supply apparatuses which is operating as the master performs the cooperative hot water supply operation in accordance with a control signal transmitted by the remote controller when the remote controller is connected to the third connection terminal of the hot water supply apparatuses operating as the master, and performs the cooperative hot water supply operation in accordance with a control signal transmitted by the remote controller when the remote controller is not connected to the third connection terminal of the hot water supply apparatuses operating as the master but is connected to the third connection terminal of the hot water supply apparatuses operating as the slave.

4. The hot water supply system according to claim 1, wherein each of the two hot water supply apparatuses has a first circuit board on which a first microcomputer is mounted and a second circuit board on which a second microcomputer is mounted, and the master control means is provided in the first microcomputer, and the slave control means is provided in the second microcomputer.

5. The hot water supply system according to claim 2, wherein each of the two hot water supply apparatuses has a third connection terminal to which a remote controller may be connected, and the master control means provided in one of the hot water supply apparatuses which is operating as the master performs the cooperative hot water supply operation in accordance with a control signal transmitted by the remote controller when the remote controller is connected to the third connection terminal of the hot water supply apparatuses operating as the master, and performs the cooperative hot water supply operation in accordance with a control signal transmitted by the remote controller when the remote controller is not connected to the third connection terminal of the hot water supply apparatuses operating as the master but is connected to the third connection terminal of the hot water supply apparatuses operating as the slave.

6. The hot water supply system according to claim 5, wherein each of the two hot water supply apparatuses has a first circuit board on which a first microcomputer is mounted and a second circuit board on which a second microcomputer is mounted, and the master control means is provided in the first microcomputer, and the slave control means is provided in the second microcomputer.

7. The hot water supply system according to claim 2, wherein each of the two hot water supply apparatuses has a first circuit board on which a first microcomputer is mounted and a second circuit board on which a second microcomputer is mounted, and the master control means is provided in the first microcomputer, and the slave control means is provided in the second microcomputer.

8. The hot water supply system according to claim 3, wherein each of the two hot water supply apparatuses has a first circuit board on which a first microcomputer is mounted and a second circuit board on which a second microcomputer is mounted, and the master control means is provided in the first microcomputer, and the slave control means is provided in the second microcomputer.

* * * * *